(12) United States Patent
Oe et al.

(10) Patent No.: US 9,910,251 B2
(45) Date of Patent: Mar. 6, 2018

(54) LENS SYSTEM AND IMAGING APPARATUS HAVING A LENS AT EACH SIDE OF AN INTERMEDIATE IMAGE WHICH MOVE IN SYNCHRONIZATION DURING FOCUSING

(71) Applicants: Kazuhiro Oe, Suwa (JP); Jeffrey Alan Gohman, Hillsboro, OR (US)

(72) Inventors: Kazuhiro Oe, Suwa (JP); Jeffrey Alan Gohman, Hillsboro, OR (US)

(73) Assignees: NITTOH INC., Nagano (JP); THEIA TECHNOLOGIES LLC, Wilsonville, OR (US)

( * ) Notice: Subject to any disclaimer, the term of this patent is extended or adjusted under 35 U.S.C. 154(b) by 257 days.

(21) Appl. No.: 14/219,677

(22) Filed: Mar. 19, 2014

(65) Prior Publication Data

US 2015/0268453 A1  Sep. 24, 2015

(51) Int. Cl.
| | |
|---|---|
| *G02B 13/00* | (2006.01) |
| *G02B 15/177* | (2006.01) |
| *G02B 13/04* | (2006.01) |
| *G02B 15/14* | (2006.01) |
| *H04N 5/232* | (2006.01) |
| *G02B 15/15* | (2006.01) |
| *G02B 13/16* | (2006.01) |

(52) U.S. Cl.
CPC ......... *G02B 13/0095* (2013.01); *G02B 13/04* (2013.01); *G02B 15/14* (2013.01); *G02B 15/177* (2013.01); *H04N 5/23212* (2013.01); *H04N 5/23296* (2013.01); *G02B 13/16* (2013.01); *G02B 15/15* (2013.01)

(58) Field of Classification Search
None
See application file for complete search history.

(56) References Cited

U.S. PATENT DOCUMENTS

| | | | |
|---|---|---|---|
| 2003/0048454 A1* | 3/2003 | Prinzhausen | A61B 5/0066 356/497 |
| 2004/0021953 A1 | 2/2004 | Betensky et al. | |
| 2004/0032653 A1 | 2/2004 | Gohman | |
| 2006/0110283 A1 | 5/2006 | Fish | |
| 2006/0227415 A1* | 10/2006 | Caldwell | G02B 15/177 359/432 |
| 2008/0198451 A1 | 8/2008 | Gohman et al. | |
| 2014/0036142 A1* | 2/2014 | Inoko | G02B 3/00 348/369 |

FOREIGN PATENT DOCUMENTS

| | | |
|---|---|---|
| JP | 02-267511 A | 11/1990 |
| JP | 2008536175 A | 9/2008 |
| JP | 2011007824 A | 1/2011 |
| JP | 2011059415 A | 3/2011 |
| JP | 2011130014 A | 6/2011 |

* cited by examiner

*Primary Examiner* — Stephone B Allen
*Assistant Examiner* — Ryan S Dunning
(74) *Attorney, Agent, or Firm* — Thompson Hine LLP

(57) ABSTRACT

There is provided a lens system includes a first optical system and forms an intermediate image, which has been formed inside the first optical system by light from an input side, into a final image. The first optical system includes a first subsystem, with the first subsystem including a first lens that is disposed at a position closest to the intermediate image on the input side and moves during focusing and a second lens that is disposed at a position closest to the intermediate image on the output side and moves during focusing.

14 Claims, 12 Drawing Sheets

Fig. 3

| LENS SURFACE NUMBER | RADIUS OF CURVATURE (Ri) | DISTANCE (di) | EFFECTIVE DIAMETER (Di) | REFRACTIVE INDEX (nd) | ABBE NUMBER ($\nu d$) | LENS NAME | |
|---|---|---|---|---|---|---|---|
| OBJECT SIDE | | d0 | | | | | |
| 1 | 47.29 | 7.00 | 71.89 | 1.7292 | 54.6792 | L101 | |
| 2 | 28.88 | 3.26 | 52.00 | | | | |
| 3 | 26.35 | 7.00 | 51.32 | 1.5831 | 59.3738 | L102 | |
| 4 | 9.52 | 23.33 | 32.37 | | | | |
| 5 | -27.62 | 2.61 | 18.35 | 1.5927 | 35.3095 | L103 | |
| 6 | 33.45 | 5.50 | 16.56 | 1.5952 | 67.7347 | L104 | LB1 |
| 7 | -16.68 | 1.00 | 16.69 | 1.7174 | 29.5176 | L105 | |
| 8 | -107.46 | 0.20 | 19.60 | | | | |
| 9 | 39.89 | 8.50 | 25.24 | 1.4388 | 94.9446 | L106 | |
| 10 | -25.17 | 0.20 | 27.11 | | | | |
| 11 | 53.78 | 7.06 | 30.65 | 1.4970 | 81.5447 | L107 | |
| 12 | -33.35 | 1.17 | 30.76 | | | | |
| 13 | -41.95 | 1.00 | 30.80 | 1.5927 | 35.3095 | L108 | |
| 14 | 100.39 | 20.36 | 32.66 | | | | |
| 15 | 71.06 | 14.21 | 56.87 | 1.8061 | 40.9253 | L109 | |
| 16 | -70.76 | Vf1 | 56.80 | | | | |
| 17 | 35.44 | 14.90 | 53.70 | 1.8052 | 25.4249 | L110 | |
| 18 | 50.96 | 20.51 | 45.65 | | | | |
| INTERMEDIATE IMAGE | | | | | | | |
| 19 | -34.87 | 1.50 | 37.46 | 1.8830 | 40.8048 | L201 | |
| 20 | 131.06 | Vf2 | 40.28 | | | | |
| 21 | -33.73 | 10.61 | 43.40 | 1.8052 | 25.4249 | L202 | |
| 22 | -32.80 | Vf3 | 51.38 | | | | |
| 23 | -77.23 | 10.76 | 56.75 | 1.8052 | 25.4249 | L203 | |
| 24 | -41.78 | Vf4/Vz1 | 59.49 | | | | |
| 25 | 70.11 | 11.44 | 66.86 | 1.6134 | 44.2670 | L204 | |
| 26 | -1168.50 | Vz2 | 66.13 | | | | |
| 27 | -573.24 | 1.50 | 52.04 | 1.8052 | 25.4249 | L205 | LB2 |
| 28 | 43.78 | 13.45 | 49.61 | 1.4388 | 94.9446 | L206 | |
| 29 | -96.59 | 0.20 | 49.73 | | | | |
| 30 | 158.24 | 4.25 | 48.83 | 1.7292 | 54.6792 | L207 | |
| 31 | 2059.88 | Vz3 | 48.26 | | | | |
| 32 | 47.54 | 7.46 | 44.08 | 1.4388 | 94.9446 | L208 | |
| 33 | 501.79 | Vz4 | 42.64 | | | | |
| STOP | Flat | 2.25 | 22.98 | | | | |
| 34 | 82.73 | 1.00 | 22.14 | 1.5481 | 45.7836 | L209 | |
| 35 | 25.55 | 0.20 | 21.42 | | | | |
| 36 | 23.76 | 6.83 | 21.46 | 1.8081 | 22.7604 | L210 | LB3 |
| 37 | -30.61 | 1.00 | 20.59 | 1.7380 | 32.2608 | L211 | |
| 38 | 41.08 | 9.25 | 19.08 | | | | |
| 39 | -30.35 | 1.00 | 20.52 | 1.8081 | 22.7604 | L212 | LB4 |
| 40 | 27.52 | 7.19 | 22.89 | 1.4970 | 81.5447 | L213 | |
| 41 | -36.40 | 0.20 | 24.97 | | | | |
| 42 | 48.02 | 7.40 | 29.09 | 1.4970 | 81.5447 | L214 | |
| 43 | -43.31 | 35.53 | 29.84 | | | | |
| 44 | Flat | 3.00 | | 1.5168 | 64.1664 | COVER GLASS | |
| 45 | Flat | 0.80 | | | | | |
| 46 | Flat | 0.00 | | | | | |
| FINAL IMAGE SIDE | | | | | | | |

Fig. 4A

|  | WIDE ANGLE END | TELEPHOTO END |
|---|---|---|
| FOCAL LENGTH [mm] | 9.5 | 18.0 |
| F NUMBER | 2.6 | 2.6 |
| HALF ANGLE OF VIEW [°] | 60.7 | 42.9 |
| IMAGE HEIGHT OF FINAL IMAGE [mm] | 16.8 | |
| TOTAL LENGTH OF LENS SYSTEM [mm] | 383 | 383 |
| BACK FOCUS (EQUIVALENT IN AIR) [mm] | 38.3 | 38.3 |
| ENTRANCE PUPIL POSITION [mm] | 25.8 | 28.3 |
| EXIT PUPIL POSITION [mm] | −43.8 | −43.8 |
| FOCAL LENGTH OF FIRST SUBSYSTEM F1 [mm] | −104 | |
| FOCAL LENGTH OF THIRD SUBSYSTEM F3 [mm] | 98 | |
| FOCAL LENGTH OF FIRST OPTICAL SYSTEM F [mm] | 218 | |
| COMBINED FOCAL LENGTH IN STATE FOCUSED AT INFINITY OBJECTIVE DISTANCE [mm] | 9.50 | 18.05 |
| COMBINED FOCAL LENTGH IN STATE FOCUSED AT SHORTEST OBJECTIVE DISTANCE [mm] | 9.49 | 17.97 |
| DISTORTION IN STATE FOCUSED AT INFINITY OBJECTIVE DISTANCE [%] | −1.0 | −0.1 |
| DISTORTION IN STATE FOCUSED AT SHORTEST OBJECTIVE DISTANCE [%] | −1.9 | −1.0 |

Fig. 4B

| ZOOM(di) | WIDE ANGLE END | TELEPHOTO END |
|---|---|---|
| d24(Vz1) | 81.00 | 24.79 |
| d26(Vz2) | 10.05 | 29.60 |
| d31(Vz3) | 0.35 | 3.14 |
| d33(Vz4) | 3.15 | 37.00 |

Fig. 4C

| FOCUS(di) | WIDE ANGLE END | | |
|---|---|---|---|
| d0 | 150 | 2300 | INF |
| d16(Vf1) | 3.57 | 0.20 | 0.10 |
| d20(Vf2) | 9.08 | 12.46 | 12.56 |
| d22(Vf3) | 8.38 | 2.00 | 1.72 |
| d24(Vf4) | 74.61 | 81.00 | 81.28 |

Fig. 4D

| FOCUS(di) | TELEPHOTO END | | |
|---|---|---|---|
| d0 | 150 | 2300 | INF |
| d16(Vf1) | 3.57 | 0.20 | 0.10 |
| d20(Vf2) | 9.08 | 12.46 | 12.56 |
| d22(Vf3) | 8.38 | 2.00 | 1.72 |
| d24(Vf4) | 18.41 | 24.79 | 25.07 |

Fig. 4E

|  | K | A4 | A6 | A8 | A10 | A12 | A14 |
|---|---|---|---|---|---|---|---|
| S3 | −4.47 | 1.3162E−05 | −8.2517E−09 | 1.6327E−11 | −2.2911E−14 | 2.4164E−17 | −6.5874E−21 |
| S4 | −0.91 | −4.4332E−06 | 8.1016E−08 | −3.6957E−10 | 1.3529E−12 | −7.5576E−15 | 8.9627E−18 |
| S11 | 0 | −1.9014E−06 | 1.6959E−08 | 3.0277E−11 | 3.7831E−14 | 0 | 0 |
| S12 | 0 | 1.8560E−05 | 2.7593E−08 | 4.7629E−11 | 1.3325E−13 | 0 | 0 |
| S15 | −16.84 | 2.8611E−06 | −3.1383E−09 | 7.8465E−12 | −7.6303E−15 | 3.5943E−18 | −4.7072E−22 |
| S16 | −13.11 | −4.6712E−06 | 8.4585E−09 | −9.2472E−12 | 1.2673E−14 | −1.0239E−17 | 3.4268E−21 |

Fig. 11

| LENS SURFACE NUMBER | RADIUS OF CURVATURE (Ri) | DISTANCE (di) | EFFECTIVE DIAMETER (Di) | REFRACTIVE INDEX (nd) | ABBE NUMBER ($\nu d$) | LENS NAME | |
|---|---|---|---|---|---|---|---|
| OBJECT SIDE | | d0 | | | | | |
| 1 | 47.28 | 7.00 | 71.41 | 1.7292 | 54.6792 | L101 | |
| 2 | 28.55 | 4.08 | 51.40 | | | | |
| 3 | 34.81 | 7.00 | 50.70 | 1.5831 | 59.3738 | L102 | |
| 4 | 10.66 | 21.90 | 31.67 | | | | |
| 5 | −27.15 | 2.98 | 17.36 | 1.7380 | 32.2608 | L103 | |
| 6 | 40.19 | 5.62 | 16.21 | 1.5952 | 67.7347 | L104 | LB1 |
| 7 | −17.99 | 1.00 | 17.99 | 1.7618 | 26.5174 | L105 | |
| 8 | −35.42 | 0.20 | 20.28 | | | | |
| 9 | 38.55 | 12.42 | 28.07 | 1.4388 | 94.9446 | L106 | |
| 10 | −27.30 | 0.20 | 31.09 | | | | |
| 11 | 59.04 | 8.08 | 33.39 | 1.4388 | 94.9446 | L107 | |
| 12 | −45.67 | 3.66 | 33.46 | | | | |
| 13 | −24.55 | 1.00 | 33.36 | 1.6989 | 30.1274 | L108 | |
| 14 | −90.04 | 13.10 | 36.46 | | | | |
| 15 | 128.38 | 7.92 | 46.95 | 1.8083 | 40.9205 | L109 | |
| 16 | −96.36 | 0.20 | 48.40 | | | | |
| 17 | 54.70 | 6.05 | 52.47 | 1.8830 | 40.8048 | L110 | |
| 18 | 107.78 | Vf1 | 51.72 | | | | |
| 19 | 40.38 | 13.14 | 50.78 | 1.8052 | 25.4560 | L111 | |
| 20 | −255.16 | 1.83 | 48.61 | | | | |
| 21 | −143.74 | 1.50 | 46.47 | 1.5638 | 60.6657 | L112 | |
| 22 | 52.64 | 17.91 | 40.57 | | | | |
| INTERMEDIATE IMAGE | | | | | | | |
| 23 | −30.74 | 1.50 | 36.28 | 1.9037 | 31.3145 | L201 | |
| 24 | 421.05 | Vf2 | 40.39 | | | | |
| 25 | −32.30 | 9.00 | 44.97 | 1.8052 | 25.4560 | L202 | |
| 26 | −30.75 | Vf3 | 51.43 | | | | |
| 27 | −63.31 | 10.00 | 57.87 | 1.8052 | 25.4560 | L203 | |
| 28 | −38.29 | Vf4/Vz1 | 60.01 | | | | |
| 29 | 67.01 | 11.15 | 65.87 | 1.5955 | 39.2416 | L204 | |
| 30 | Flat | Vz2 | 65.12 | | | | |
| 31 | −298.40 | 1.50 | 51.62 | 1.8052 | 25.4560 | L205 | LB2 |
| 32 | 45.36 | 13.12 | 49.90 | 1.4388 | 94.9446 | L206 | |
| 33 | −101.58 | 0.20 | 50.21 | | | | |
| 34 | 130.93 | 4.92 | 50.17 | 1.7292 | 54.6792 | L207 | |
| 35 | Flat | Vz3 | 49.80 | | | | |
| 36 | 50.72 | 8.12 | 47.43 | 1.4388 | 94.9446 | L208 | |
| 37 | 1044.90 | Vz4 | 46.25 | | | | |
| STOP | Flat | 1.57 | 23.09 | | | | |
| 38 | 44.19 | 1.00 | 22.30 | 1.5927 | 35.3095 | L209 | |
| 39 | 25.19 | 0.20 | 21.61 | | | | |
| 40 | 23.29 | 6.65 | 21.63 | 1.8081 | 22.7604 | L210 | LB3 |
| 41 | −35.50 | 1.00 | 20.55 | 1.7380 | 32.2608 | L211 | |
| 42 | 30.82 | 10.11 | 18.82 | | | | |
| 43 | −29.96 | 1.00 | 20.32 | 1.8081 | 22.7604 | L212 | LB4 |
| 44 | 28.25 | 7.08 | 22.70 | 1.4970 | 81.5447 | L213 | |
| 45 | −35.94 | 0.20 | 24.79 | | | | |
| 46 | 48.87 | 7.35 | 28.85 | 1.4970 | 81.5447 | L214 | |
| 47 | −42.45 | 33.76 | 29.63 | | | | |
| 48 | Flat | 3.00 | | 1.5168 | 64.1664 | COVER GLASS | |
| 49 | Flat | 0.80 | | | | | |
| 50 | Flat | 0.00 | | | | | |
| FINAL IMAGE SIDE | | | | | | | |

Fig. 12A

| | WIDE ANGLE END | TELEPHOTO END |
|---|---|---|
| FOCAL LENGTH [mm] | 9.5 | 18.0 |
| F NUMBER | 2.6 | 2.6 |
| HALF ANGLE OF VIEW [°] | 60.7 | 43.0 |
| IMAGE HEIGHT OF FINAL IMAGE [mm] | 16.8 | |
| TOTAL LENGTH OF LENS SYSTEM [mm] | 383 | 383 |
| BACK FOCUS (EQUIVALENT IN AIR) [mm] | 36.5 | 36.5 |
| ENTRANCE PUPIL POSITION [mm] | 25.0 | 27.5 |
| EXIT PUPIL POSITION [mm] | −43.5 | 43.5 |
| FOCAL LENGTH OF FIRST SUBSYSTEM F1 [mm] | −128 | |
| FOCAL LENGTH OF THIRD SUBSYSTEM F3 [mm] | 101 | |
| FOCAL LENGTH OF FIRST OPTICAL SYSTEM F [mm] | 194 | |
| COMBINED FOCAL LENGTH IN STATE FOCUSED AT INFINITY OBJECTIVE DISTANCE [mm] | 9.50 | 17.95 |
| COMBINED FOCAL LENTGH IN STATE FOCUSED AT SHORTEST OBJECTIVE DISTANCE [mm] | 9.51 | 17.93 |
| DISTORTION IN STATE FOCUSED AT INFINITY OBJECTIVE DISTANCE [%] | −1.0 | −0.6 |
| DISTORTION IN STATE FOCUSED AT SHORTEST OBJECTIVE DISTANCE [%] | −1.3 | −0.1 |

Fig. 12B

| ZOOM(di) | WIDE ANGLE END | TELEPHOTO END |
|---|---|---|
| d28(Vz1) | 78.76 | 23.60 |
| d30(Vz2) | 14.97 | 32.04 |
| d35(Vz3) | 0.35 | 0.35 |
| d37(Vz4) | 3.07 | 41.16 |

Fig. 12C

| FOCUS(di) | WIDE ANGLE END | | |
|---|---|---|---|
| d0 | 150 | 2300 | INF |
| d18(Vf1) | 4.33 | 1.50 | 1.24 |
| d24(Vf2) | 10.44 | 13.72 | 13.53 |
| d26(Vf3) | 7.56 | 2.00 | 1.50 |
| d28(Vf4) | 73.20 | 78.76 | 79.27 |

Fig. 12D

| FOCUS(di) | TELEPHOTO END | | |
|---|---|---|---|
| d0 | 150 | 2300 | INF |
| d18(Vf1) | 4.33 | 1.50 | 1.24 |
| d24(Vf2) | 10.44 | 13.27 | 13.53 |
| d26(Vf3) | 7.56 | 2.00 | 1.50 |
| d28(Vf4) | 18.04 | 23.60 | 24.10 |

Fig. 12E

| | K | A4 | A6 | A8 | A10 | A12 | A14 |
|---|---|---|---|---|---|---|---|
| S3 | −1.01 | 8.0575E−06 | −8.2625E−09 | 1.9526E−11 | −2.5226E−14 | 2.4164E−17 | −6.6848E−21 |
| S4 | −0.70 | 1.0536E−05 | −3.5406E−08 | −1.4536E−10 | 2.5726E−13 | −7.5576E−15 | 8.9627E−18 |
| S15 | −94.56 | −4.3335E−07 | −3.1002E−09 | 8.1147E−12 | −7.7349E−15 | 3.5943E−18 | −4.6357E−22 |
| S16 | −21.56 | −3.8624E−06 | 8.3712E−09 | −1.1216E−11 | 1.4615E−14 | −1.0239E−17 | 3.4206E−21 |

LENS SYSTEM AND IMAGING APPARATUS HAVING A LENS AT EACH SIDE OF AN INTERMEDIATE IMAGE WHICH MOVE IN SYNCHRONIZATION DURING FOCUSING

BACKGROUND

The present invention relates to a lens system and an imaging apparatus that uses such lens system.

Japanese Laid-Open Patent Publication No. 2003-232993 (hereinafter simply "Document 1") discloses the provision of a refractive optical system that forms an intermediate image and is capable of maintaining a favorable image forming performance in spite of using a small number of lenses. To do so, Document 1 discloses a refractive optical system including a lens group that forms an intermediate image of a subject, a field lens group disposed in the periphery of the formation position of the intermediate image, and a relay lens group that reforms the intermediate image into another image, where the focal length f1 of the image forming group and the focal length f of the refractive optical system satisfy the condition "1<|f1/f|<3".

SUMMARY

A wide-angle lens system that reforms an intermediate image into a final image with superior focusing performance is demanded.

A first aspect of the present invention is a lens system that includes a first optical system and forms an intermediate image, which has been formed inside the first optical system by light from an input side, into a final image on an output side. The first optical system includes a first subsystem that moves during focusing, and the first subsystem includes: a first lens that is disposed at a position closest to the intermediate image on the input side and moves during focusing; and a second lens that is disposed at a position closest to the intermediate image on the output side and moves during focusing.

In this lens system, by forming light from the input side as an intermediate image and reforming light from the intermediate image as a final image, light flux of each angle of view in the periphery of the intermediate image are likely to be separated on the input side and the output side of the intermediate image. This means that by moving the first and second lenses that are disposed so as to sandwich the intermediate image from the input side and the output side, it is possible to carry out focusing without dramatically changing the ray paths of each angle of view. Accordingly, it is possible to provide a lens system that is capable of adjusting focus while suppressing fluctuations in aberrations that accompany focusing.

The first optical system should preferably further include: a second subsystem with positive refractive power that is positioned on the output side of the first subsystem and does not move during focusing; and a third subsystem that is positioned on the output side of the second subsystem and includes a lens that moves so as to compensate for movement of the first subsystem during focusing.

By fixing the second subsystem with positive refractive power on the output side of the first subsystem, it is possible to output light flux dispersed on the output side of the intermediate image to the output side in a state that is extremely close to telecentric. This means that it is possible to move the lens of the third subsystem relative to light flux that is incident in a state that is close to telecentric. Accordingly, it is possible to favorably correct various aberrations produced by the first subsystem using the third subsystem while suppressing fluctuations in image magnification during focusing.

It is preferable for a focal length f1 of the first subsystem, a focal length f3 of the third subsystem, and a focal length f of the first optical system to satisfy Conditions (1.1) to (1.3) below.

$$-200<f1<-90 \qquad (1.1)$$

$$90<f3<200 \qquad (1.2)$$

$$190<f<300 \qquad (1.3)$$

By making the power of the first optical system weak as shown in Condition (1.3) and reversing the powers of the first and third subsystems that move out of the first optical system with a substantially equal power balance as shown in Conditions (1.1) and (1.2), it is possible, using the third subsystem, to favorably correct various aberrations produced by the first subsystem during focusing. When the ranges of Conditions (1.1) to (1.3) are exceeded, the power balance of the first and third subsystems is destroyed and it becomes difficult to suppress fluctuations in angle of view during focusing, so-called "focus breathing".

The lens system should preferably further include a second optical system that is disposed on an output side of the first optical system and includes a zooming system.

It is preferable for a focal length fwf in a state focused at an infinity distance at the wide angle end of the lens system, a focal length fwn in a state focused at the shortest distance at the wide angle end of the lens system, a focal length ftf in a state focused at an infinity distance at the telephoto end of the lens system, and a focal length ftn in a state focused at the shortest distance at the telephoto end of the lens system to satisfy Conditions (2.1) and (2.2) below.

$$|1-fwf/fwn|<0.005 \qquad (2.1)$$

$$|1-ftf/ftn|<0.005 \qquad (2.2)$$

It is also preferable for the distortion dwf in a state focused at an infinity distance at the wide angle end of the lens system, the distortion dwn in a state focused at the shortest distance at the wide angle end of the lens system, the distortion dtf in a state focused at an infinity distance at the telephoto end of the lens system, and the distortion dtn in a state focused at the shortest distance at the telephoto end of the lens system to satisfy Conditions (3.1) and (3.2) below.

$$|dwn-dwf|<1.0 \qquad (3.1)$$

$$|dtn-dtf|<1.0 \qquad (3.2)$$

Another aspect of the present invention is an imaging apparatus including the lens system described above and an imaging device disposed at a position where the final image of the lens system is formed.

BRIEF DESCRIPTION OF THE DRAWINGS

FIG. 1A is a diagram showing an arrangement of a lens system according to a first embodiment of the present invention and an imaging apparatus that uses such lens system and shows the lens arrangement at the wide-angle end, while

FIG. 2A is a diagram showing focusing at the wide angle end of the lens system according to the first embodiment, and shows the lens arrangement in a state where focus is set for the shortest objective distance, while

FIG. 3 is a table showing lens data of the respective lenses in the lens system according to the first embodiment;

FIG. 4A is a table showing various numeric values of the lens system according to the first embodiment and shows basic data, FIG. 4B shows zoom data, FIG. 4C shows focus data at the wide angle end, FIG. 4D shows focus data at the telephoto end, and FIG. 4E shows aspherical surface data;

FIG. 5A is an aberration graph at the wide angle end of the lens system according to the first embodiment and shows a state focused at the shortest distance, while

FIG. 6A is an aberration graph at the telephoto end of the lens system according to the first embodiment and shows a state focused at the shortest distance, while

FIG. 9A is a diagram showing an arrangement of a lens system according to a second embodiment of the present invention and an imaging apparatus that uses such lens system and shows the lens arrangement at the wide angle end, while

FIG. 10A is a diagram showing focusing at the wide angle end of the lens system according to the second embodiment, and shows the lens arrangement in a state where focus is set for the shortest objective distance, while

FIG. 11 is a table showing lens data of the respective lenses in the lens system according to the second embodiment;

FIG. 12A is a table showing various numeric values of the lens system according to the second embodiment and shows basic data, FIG. 12B shows zoom data, FIG. 12C shows focus data at the wide angle end, FIG. 12D shows focus data at the telephoto end, and FIG. 12E shows aspherical surface data;

FIG. 13A is an aberration graph at the wide angle end of the lens system according to the second embodiment and shows a state focused at the shortest distance, while

FIG. 14A is an aberration graph at the telephoto end of the lens system according to the second embodiment and shows a state focused at the shortest distance, while

DETAILED DESCRIPTION

Figure 1A:
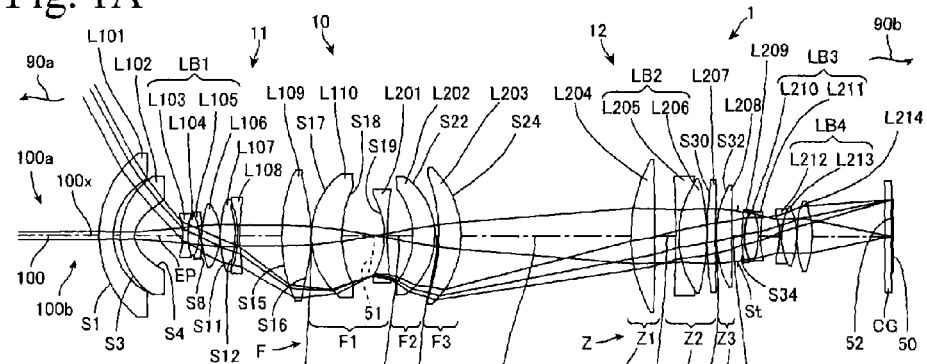
Figure 1B:
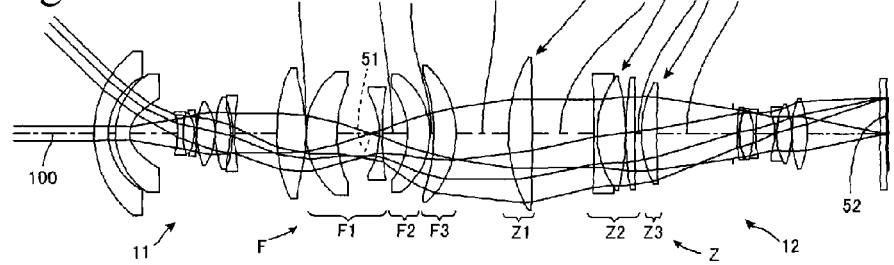
FIG. 1B shows the lens arrangement at the telephoto end.
Figure 2A:
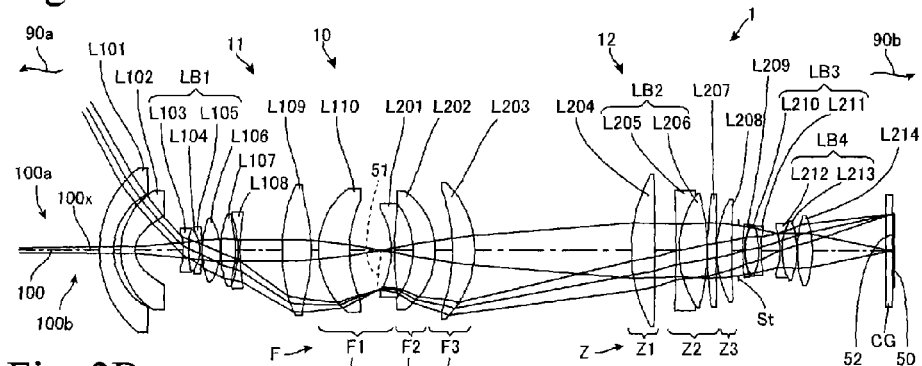
Figure 2B:
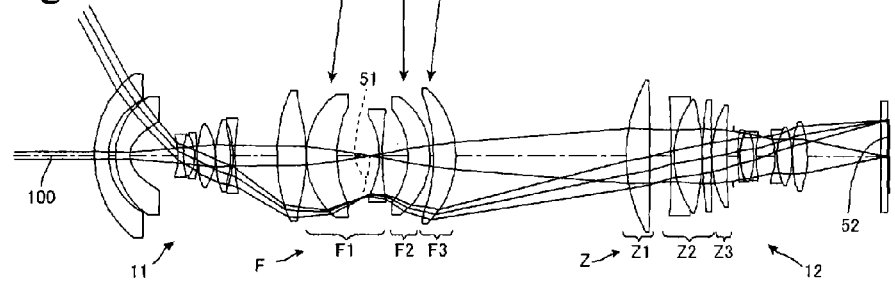
FIG. 2B shows the lens arrangement in a state where focus is set for an infinite objective distance.

FIG. 1A and FIG. 1B show the arrangement of a lens system 10 according to a first embodiment of the present invention and an imaging apparatus 1 that uses such lens system 10, with FIG. 1A showing the lens arrangement at the wide angle end (WIDE) and FIG. 1B showing the lens arrangement at the telephoto end (TELE). FIG. 2A and FIG. 2B show focusing at the wide-angle end of the lens system 10, with FIG. 2A showing the lens arrangement in a state where focus is set for the shortest objective distance (a near objective distance) and FIG. 2B showing the lens arrangement in a state where focus is set for an infinity objective distance.

The imaging apparatus (camera) 1 includes the lens system 10 and an imaging device 50 disposed at a position where the final image 52 of the lens system 10 is formed. The lens system 10 is composed, in order from the input side (object side, incident side) 90a, of a first lens group (primary lens group) 11 that forms light from the input side 90a into an image as an intermediate image 51 and a second lens group (secondary lens group, relay lens group) 12 that forms light from the intermediate image 51 into an image as the final image 52. The lens system 10 is an image reforming-type lens system (two-stage optical system) composed of a total of twenty-four glass lenses numbered L101 to L110 and L201 to L214, and includes, inside the first lens group 11 and the second lens group 12, a first optical system (focusing optical system) F that carries out focusing and a zooming optical system Z that carries out zooming. One example of the imaging device 50 is an image sensor (imaging element) such as a CCD or a CMOS that converts the final image 52 into an electrical signal (image data).

The first lens group 11 forms light flux incident from a region 100a on one side of a plane 100x that includes the optical axis 100 (the "first region", the upper half region in FIG. 1A to FIG. 2B) into an image as the inverted intermediate image (or "inverted image") 51 on the opposite side to the first region 100a, that is, a region 100b on the other side of the plane 100x that includes the optical axis 100 (the "second region", the lower half region in FIG. 1A to FIG. 2B). The second lens group 12 forms light flux from the intermediate image 51 into an image as the final image (or "upright image") 52, where up-down and left-right of the intermediate image 51 are inverted, in the first region 100a.

The first lens group 11 is composed of a meniscus-type negative lens L101 whose convex surface S1 is oriented toward the input side 90a, a meniscus-type negative lens L102 whose convex surface S3 is oriented toward the input side 90a, a cemented lens (balsam lens) LB1 where three lenses are stuck together, a biconvex positive lens L106, a biconvex positive lens L107, a biconcave negative lens L108, a biconvex positive lens L109, and a meniscus-type positive lens L110 whose convex surface S17 is oriented toward the input side 90a, disposed in that order from the subject side 10a.

The cemented lens LB1 of the first lens group 11 is composed of a biconcave negative lens L103, a biconvex positive lens L104, and a meniscus-type negative lens L105 whose convex surface S8 is oriented toward the output side (final image side, emission side, image forming side) 90b, disposed in that order from the input side 90a. Both surfaces of the negative lens L102, that is, the convex surface S3 on the input side 90a and the concave surface S4 on the output side 90b, are aspherical surfaces. Both surfaces of the positive lens L107, that is, the convex surface S11 on the input side 90a and the convex surface S12 on the output side 90b, are aspherical surfaces. Both surfaces of the positive lens L109, that is, the convex surface S15 on the input side 90a and the convex surface S16 on the output side 90b, are aspherical surfaces. The negative lens L101 positioned closest to the input side 90a is the lens with the largest effective diameter (aperture) in the lens system 10 and, with an effective diameter of 71.89 mm, is compact for a video pickup lens.

The second lens group 12 is composed of a biconcave negative lens L201, a meniscus-type positive lens L202 whose convex surface S22 is oriented toward the output side 90b, a meniscus-type positive lens L203 whose convex surface S24 is oriented toward the output side 90b, a biconvex positive lens L204, a cemented lens LB2 where two lenses are stuck together, a meniscus-type positive lens L207 whose convex surface S30 is oriented toward the input side 90a, a meniscus-type positive lens L208 whose convex surface S32 is oriented toward the input side 90a, an aperture stop St, a meniscus-type negative lens L209 whose convex surface S34 is oriented toward the input side 90a, a cemented lens LB3 where two lenses are stuck together, a cemented lens LB4 where two lenses are stuck together, and a biconvex positive lens L214, disposed in that order from the input side 90a. The imaging device 50 is disposed on the output side 90b of the second lens group 12 with a cover glass CG in between. The imaging device 50 is capable of providing image data to a host apparatus such as a personal computer and/or transferring the image data to an external information processing apparatus via a computer network or the like.

The cemented lens LB2 of the second lens group 12 is composed of a biconcave negative lens L205 and a biconvex positive lens L206 disposed in that order from the input side 90a. The cemented lens LB3 is composed of a biconvex positive lens L210 and a biconcave negative lens L211 disposed in that order from the input side 90a. The cemented lens LB4 is composed of a biconcave negative lens L212 and a biconvex positive lens L213 disposed in that order from the input side 90a.

With this lens system 10, light flux that is taken in from a wide area (a wide angle) via the negative lens L101, which is disposed closest to the input side 90a and has the largest effective diameter, is guided by the first lens group 11 across the optical axis 100 to the opposite side (the second region 100b) to form an intermediate image (primary image formation) which is the inverted image 51. Such light flux is then guided across the optical axis 100 toward the original side (the first region 100a) of the optical axis 100 by the second lens group 12 and formed into the final image (secondary image formation) which is the upright image 52. That is, by having light (i.e., off-axis rays) that is incident from the first region 100a cross the optical axis 100 twice, an image is reformed in the first region 100a on the same side as the incident light. This means that it is not necessary to refract and carry out final image formation for wide-angle off-axis light rays using only the first region 100a, which makes it easier to make the system more wide angle while suppressing the production of various aberrations.

The zooming optical system (zoom lens group) Z of the lens system 10 is composed of a first subsystem (first sub-optical system) Z1 that moves during zooming and has positive refractive power, a second subsystem (second sub-optical system) Z2 that moves during zooming and has positive refractive power, and a third subsystem (third sub-optical system) Z3 that moves during zooming and has positive refractive power. The first subsystem Z1 is composed of the positive lens L204 of the second lens group 12. The second subsystem Z2 is composed of the cemented lens LB2 and the positive lens L207 disposed in that order on the output side 90b of the positive lens L204. The third subsystem Z3 is composed of the positive lens L208 disposed on the output side 90b of the positive lens L207.

With this lens system 10, when zooming from the wide-angle end to the telephoto end, while all of the lenses L101 to L110 of the first lens group 11 and the lenses L201 to L203 and the lenses L209 to L214 of the second lens group 12 do not move, zooming is carried out by monotonously moving the optical systems Z1 to Z3 along the optical axis 100 from the output side 90b toward the input side 90a. Accordingly, there is no fluctuation in the image formation position of the intermediate image 51 due to zooming, and at each zoom position from the wide-angle end to the telephoto end, it is possible to prevent the plane of the intermediate image from becoming positioned at a lens surface or inside a lens. This means that it is possible to suppress scratches or foreign matter such as dust on lens surfaces from appearing in the final image 52. In addition, in the lens system 10, by disposing the stop St on the output side 90b of the zooming optical system Z and fixing the stop St so as to not move during zooming, there is no change in the aperture diameter and it is possible to suppress fluctuations in the f number due to zooming. Accordingly, it is possible to realize a lens layout where the stop St is disposed on the output side 90b of the zooming optical system Z, which is favorable for a video (cinema) lens, and to also simplify the zooming mechanism.

The first optical system (focus lens group) F of the lens system 10 is composed, in order from the input side 90a, of a first subsystem (first sub-optical system) F1 which has negative refractive power and moves during focusing, a second subsystem (second sub-optical system) F2 which has positive refractive power and does not move during focusing, and a third subsystem (third sub-optical system) F3 which has positive refractive power and moves during focusing. The first subsystem F1 is composed of the positive lens L110 disposed closest to the output side 90b of the first lens group 11 and the negative lens L201 disposed closest to the input side 90a of the second lens group 12. The second subsystem F2 is composed of the positive lens L202 disposed on the output side 90b of the negative lens L201. The third subsystem F3 is composed of the positive lens L203 disposed on the output side 90b of the positive lens L202.

The first subsystem F1 is composed of the positive lens (first lens) L110 disposed at a position that is closest to the intermediate image 51 from the input side 90a and the negative lens (second lens) L201 disposed at a position that is closest to the intermediate image 51 from the output side 90b. Accordingly, both lenses L110 and L201 of the first subsystem F1 are disposed so as to sandwich the intermediate image 51, which is formed in the space between the first lens group 11 and the second lens group 12, from the input side 90a and the output side 90b with only air gaps in between.

With this lens system 10, when moving the focus from the shortest (a near) objective distance to an infinity objective distance, the lenses L101 to L109 of the first lens group 11 and the optical system F2 (the lens L202) and the lenses L204 to L214 of the second lens group 12 do not move and focusing (adjustment of the focal point) is carried out by monotonously moving the optical systems F1 and F3 along the optical axis 100 from the output side 90b toward the input side 90a. About the intermediate image 51, light flux that is incident from the input side 90a is focused to form the intermediate image 51 on the input side 90a of the intermediate image 51, and light flux that emerges from the intermediate image 51 diverges on the output side 90b of the intermediate image 51. This means that it is easy to separate the light flux for each angle of view before and after the intermediate image 51. Accordingly, by moving the lenses L110 and L201 that sandwich the intermediate image 51, it is possible to carry out focusing without dramatically changing the ray paths of each angle of view. The second lens L201 may move independently or in synchronization with the first lens L110.

In this lens system 10, the lenses L110 and L201 on both sides of the intermediate image 51 are disposed with the concave surfaces S18 and S19 facing one another. This means that it is possible to reverse the curvatures of the lens surfaces closest to the intermediate image 51. Accordingly, it is easy to correct various aberrations produced by the lens L110 that moves on the input side 90a of the intermediate image 51 using the lens L201 that moves on the output side 90b of the intermediate image 51. In addition, light flux is focused before and after the intermediate image 51, which narrows the light flux diameter for each angle of view. This means that it is possible to reduce the lens diameters of the lenses L110 and L201 disposed before and after the intermediate image 51. Accordingly, it is easy to simplify the focusing mechanism.

In this lens system 10, the positive lens L109, both of whose surfaces S15 and S16 are aspherical, is disposed on the input side 90a of the first optical system F. This means that it is possible, using the positive lens L109, to output light flux that has been gathered from a wide angle by the negative lens L101 disposed closest to the input side 90a to the output side 90b in a state that is extremely close to telecentric. Accordingly, it is possible to move the first subsystem F1 disposed on the output side 90b of the positive lens L109 relative to collimated light flux. This means that it is possible to carry out focusing while suppressing fluctuations or variations in magnification. In addition, using the positive lens L109, both of whose surfaces are aspherical, it is possible to suppress the production of distortion and curvature of field when converting the incident light to substantially parallel light. Accordingly, it is possible to suppress an increase in the number of lenses and to suppress an increase in the overall length of the optical system.

In this lens system 10, the positive lens L202 of the second subsystem F2 disposed on the output side 90b of the negative lens L201 of the first subsystem F1 is fixed. This means that it is possible, using the positive lens L202, to output light flux that diverges on the output side 90b of the intermediate image 51 to the output side 90b in a state that is extremely close to telecentric. Accordingly, it is possible to move the lens L203 of the third subsystem F3 disposed on the output side 90b of the positive lens L202 relative to collimated light flux. This means that it is possible to provide the lens system 10 that is capable of adjusting focus while suppressing fluctuations in aberration that accompany focusing.

In this lens system 10, since the lens L101 closest to the input side 90a and the lens L214 closest to the output side 90b do not move, it is possible to carry out zooming and focusing without changing the overall length of the lens system 10. In addition, with the lens system 10, the entrance pupil EP is positioned between the negative lens L102 and the negative lens L103, in the present embodiment at a distance of 5.46 mm toward the output side 90b from the convex surface S1 on the input side 90a of the negative lens L101. This means that it is possible to dispose only lenses with negative refractive power on the input side 90a of the entrance pupil EP. Accordingly, it is easy to make the system effectively more wide angle without increasing the lens diameters of the negative lenses L101 and L102. In addition, by disposing the cemented lens LB1, which is stuck together with a low dispersion positive lens L104 sandwiched between the high dispersion negative lenses L103 and L105, it is possible to favorably correct chromatic aberration of the lens system 10 as a whole.

The lens system 10 is designed so that the combined focal length f1 of the first subsystem F1, the combined focal length f3 of the first subsystem F3, and the combined focal length f of the first optical system F satisfy conditions (1.1) to (1.3) below. Note that the units are millimeters.

$$-200 < f1 < -90 \tag{1.1}$$

$$90 < f3 < 200 \tag{1.2}$$

$$190 < f < 300 \tag{1.3}$$

In this lens system 10, by making the power of the first optical system F weak as shown in Condition (1.3) and reversing the powers of the optical systems F1 and F3 that move out of the first optical system F with a substantially equal power balance as shown in Conditions (1.1) and (1.2), it is possible, using the optical system F3, to favorably correct various aberrations produced by the optical system F1 due to focusing.

As the upper limit of Condition (1.1), "−95" is preferable and "−100" is much more preferable. As the lower limit of Condition (1.1), "−150" is preferable and "−130" is much more preferable. As the upper limit of Condition (1.2), "150" is preferable and "110" is much more preferable. As the lower limit of Condition (1.2), "92.5" is preferable and "95" is much more preferable. As the upper limit of Condition (1.3), "270" is preferable and "240" is much more preferable. As the lower limit of Condition (1.3), "20" is preferable and "210" is much more preferable. When the ranges of Conditions (1.1) to (1.3) are exceeded, the power balance of the optical systems F1 and F3 is destroyed and it becomes difficult to suppress fluctuations in angle of view, so-called "focus breathing", that accompany focusing.

In this lens system 10, light flux is dispersed so as to not become concentrated in a state where incident light flux and emitted light flux on the input side 90a and the output side 90b of the intermediate image 51 are near-telecentric, and focusing is carried out by moving the optical system F1 which sandwiches the intermediate image 51 and also moving the optical system F3 in concert with the optical system F1 so as to compensate for the movement of the optical system F1. Accordingly, a design is used where the combined focal length fwf for a state focused at an infinity distance at the wide angle end, the combined focal length fwn for a state focused at the shortest distance (a near distance) at the wide angle end, the combined focal length ftf for a state focused at an infinity distance at the telephoto end, and the combined focal length ftn for a state focused at the shortest distance at the telephoto end satisfy Condition (2.1) and (2.2) below.

$$|1 - fwf/fwn| < 0.005 \tag{2.1}$$

$$|1 - ftf/ftn| < 0.005 \tag{2.2}$$

In this lens system 10, by satisfying Conditions (2.1) and (2.2) it is possible to precisely carry out adjustment of the focus position from the shortest distance to an infinity distance while suppressing fluctuations or variations in aberrations that accompany focusing and focus breathing. If the upper limits of Conditions (2.1) and (2.2) are exceeded, the fluctuations in the focal length that accompany focusing become larger and it becomes difficult to suppress fluctuations in the image size and the angle of view.

The lens system 10 is also designed so that the distortion dwf for a state focused at an infinity distance at the wide angle end, the distortion dwn for a state focused at the shortest distance (a near distances) at the wide angle end, the distortion dtf for a state focused at an infinity distance at the telephoto end, and the distortion dtn for a state focused at the shortest distance at the telephoto end satisfy Condition (3.1) and (3.2) below. Note that the units are percentages.

$$|dwn-dwf|<1.0 \qquad (3.1)$$

$$|dtn-dtf|<1.0 \qquad (3.2)$$

In this lens system 10, by satisfying Conditions (3.1) and (3.2) it is possible to precisely carry out adjustment of the focus position from the shortest distance to an infinity distance while suppressing fluctuations in distortion that accompany focusing. If the upper limits of Conditions (3.1) and (3.2) are exceeded, the fluctuations in distortion that accompany focusing become larger and it becomes difficult to suppress fluctuations in distortion in the periphery of the object (subject) and the background field.

In this lens system 10, the respective Abbe numbers of all of the lenses L101 to L110 and L201 to L214 are larger than 22. In addition, a design is used where the Abbe numbers of the lenses L110, L202, and L203 with positive refractive power in the first optical system F are larger than 25. It is possible to suppress a drop in the internal transmittance of light with short wavelengths. In addition, by making the Abbe number of every lens in the lens system 10 larger than 22, it is possible to reduce the usage of high-dispersion lenses with high refractive powers. This makes it easy to improve the light transmission characteristics at each wavelength. Accordingly, it is possible to provide the lens system 10 that is suited as a cinema (video) interchangeable lens which satisfies the standard values of CCI (Color Contribution Index), which is an international standard relating to a color reproduction index.

Normally, for a wide angle lens system with a large image circle that is compatible with a large imaging element used for image pickup of video and the like, it is not easy to provide a focus system with superior optical performance that is uniform from the shortest distance (nearest) to an infinity distance, that is, which suppresses changes in curvature of field and distortion. In addition, in an imaging system that is mainly used for image pickup of moving images such as pickup of cinema or television images, camerawork that emphasizes the subject by making active use of a focus system to move the subject in and out of focus is sometimes used. When doing so, it is not desirable to have changes in the background field and changes in the subject size (called "focus breathing") that are caused by changes in the angle of view or changes in distortion that accompany focusing.

In the lens system 10, off-axis light rays that are incident from the input side (subject side, object side) 90a cross the optical axis 100 to form an inverted image and then cross the optical axis 100 again to form an upright image. This means that it is easy to take in wide angle off-axis light rays while suppressing the production of various aberrations and make the lens system more wide angle. In addition, by moving the optical system F1 that sandwiches the intermediate image 51, it is possible to carry out focus adjustment in a wide focus range while suppressing fluctuations in aberrations that accompany focusing. Accordingly, it is possible to provide the lens system 10 that makes it easy to suppress focus breathing and is favorable for applications such as pickup of video images.

FIG. 3 shows lens data of the respective lenses of the lens system 10. FIGS. 4A to 4E show various numeric values of the lens system 10, with FIG. 4A showing basic data, FIG. 4B showing zoom data, FIG. 4C showing focus data at the wide angle end, FIG. 4D showing focus data at the telephoto end, and FIG. 4E showing aspherical surface data. In FIG. 3, "Ri" represents the radius of curvature (mm) of each lens (i.e., each lens surface) disposed in order from the input side 90a, "di" represents the distance (mm) between the respective lens surfaces disposed in order from the input side 90a, "Di" represents the effective diameter (mm) of each lens surface disposed in order from the input side 90a, "nd" represents the refractive index (d line) of each lens disposed in order from the input side 90a, and "vd" represents the Abbe number (d line) of each lens disposed in order from the input side 90a. In FIG. 3, "Flat" indicates a flat surface. In FIG. 4A, the entrance pupil position shows the distance from the convex surface S1 of the negative lens L101 and the exit pupil position shows the distance from the image plane of the imaging device 50. This also applies to the embodiment described later.

As shown in FIG. 4B, in the lens system 10, the air gap (the distance on the optical axis) d24 between the positive lens L203 and the positive lens L204, the air gap d26 between the positive lens L204 and the negative lens L205, the air gap d31 between the positive lens L207 and the positive lens L208, and the air gap d33 between the positive lens L208 and the stop St all change during zooming. Also, as shown in FIGS. 4C and 4D, in the lens system 10, the air gap d16 between the positive lens L109 and the positive lens L110, the air gap d20 between the negative lens L201 and the positive lens L202, the air gap d22 between the positive lens L202 and the positive lens L203, and the air gap d24 between the positive lens L203 and the positive lens L204 change during focusing.

Also, as shown in FIG. 4E, both surfaces S3 and S4 of the negative lens L102, both surfaces S11 and S12 of the positive lens L107, and both surfaces S15 and S16 of the positive lens L109 are aspherical surfaces. The aspherical surfaces are expressed by the following expression using the coefficients K, A4, A6, A8, A10, A12, and A14 shown in FIG. 4E with X as the coordinate in the optical axis direction, Y as the coordinate in a direction perpendicular to the optical axis, the direction in which light propagates as positive, and R as the paraxial radius of curvature. Note that "En" represents "10 to the power n".

$$X=(1/R)Y^2/[1+\{1-(1+K)(1/R)^2Y^2\}^{1/2}]+A4Y^4+A6Y^6+A8Y^8+A10Y^{10}+A12Y^{12}+A14Y^{14}$$

The values in the equations given as Conditions (1.1) to (1.3), (2.1) to (2.2), and (3.1) to (3.2) given earlier for the lens system 10 according to the present embodiment are as shown below using the various values in FIG. 4A.

| | |
|---|---|
| $f1=-104$ | Condition (1.1) |
| $f3=98$ | Condition (1.2) |
| $f=218$ | Condition (1.3) |
| $\|1-fwf/fwn\|=0.001$ | Condition (2.1) |
| $\|1-ftf/ftn\|=0.004$ | Condition (2.2) |
| $\|dwn-dwf\|=0.9$ | Condition (3.1) |
| $\|dtn-dtf\|=0.9$ | Condition (3.2) |

Accordingly, the lens system 10 according to the present embodiment satisfies Conditions (1.1) to (1.3), (2.1) to (2.2), and (3.1) to (3.2).

Figure 5A:
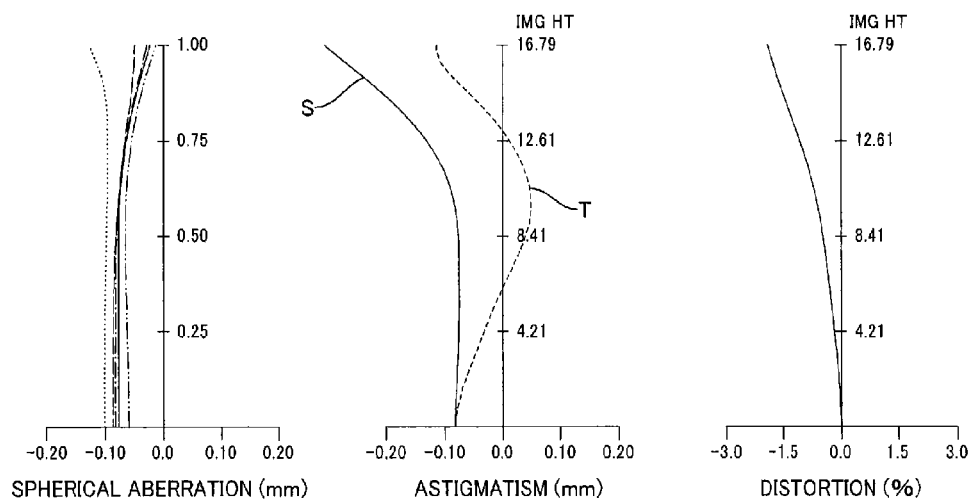
Figure 5B:
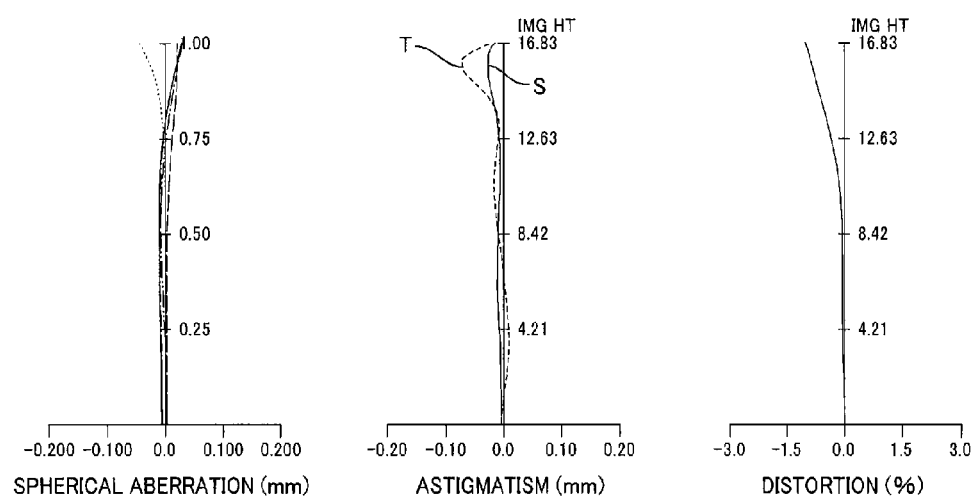
FIG. 5B is an aberration graph for a state focused at an infinity distance.
Figure 6A:
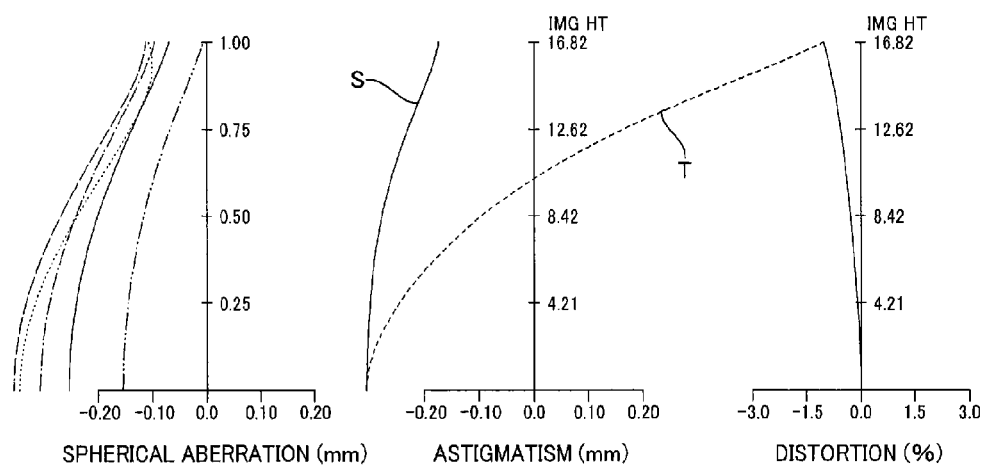
Figure 6B:
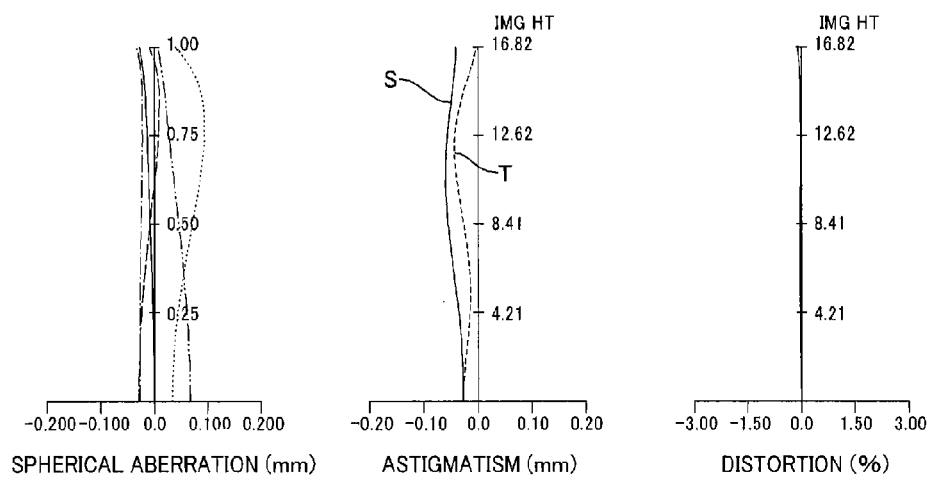

FIGS. 5A and 5B show aberration graphs at the wide angle end of the lens system 10 with FIG. 5A showing an aberration graph for a state focused at the shortest distance and FIG. 5B showing an aberration graph for a state focused at an infinity distance. FIGS. 6A and 6B show aberration graphs at the telephoto end of the lens system 10 with FIG. 6A showing an aberration graph for a state focused at the shortest distance and FIG. 6B showing an aberration graph for a state focused at an infinity distance. As shown in such drawings, all of the aberrations are favorably corrected and it is possible to pick up sharp images. Note that spherical aberration is shown for the respective wavelengths of 656 nm (dot-dot-dash line), 587 nm (solid line), 546 nm (dot-dash line), 486 nm (dashed line), and 435 nm (dotted line). In addition, astigmatism is shown separately for tangential rays (T) and sagittal rays (S). This is also the case for the embodiment described later.

Figure 7:
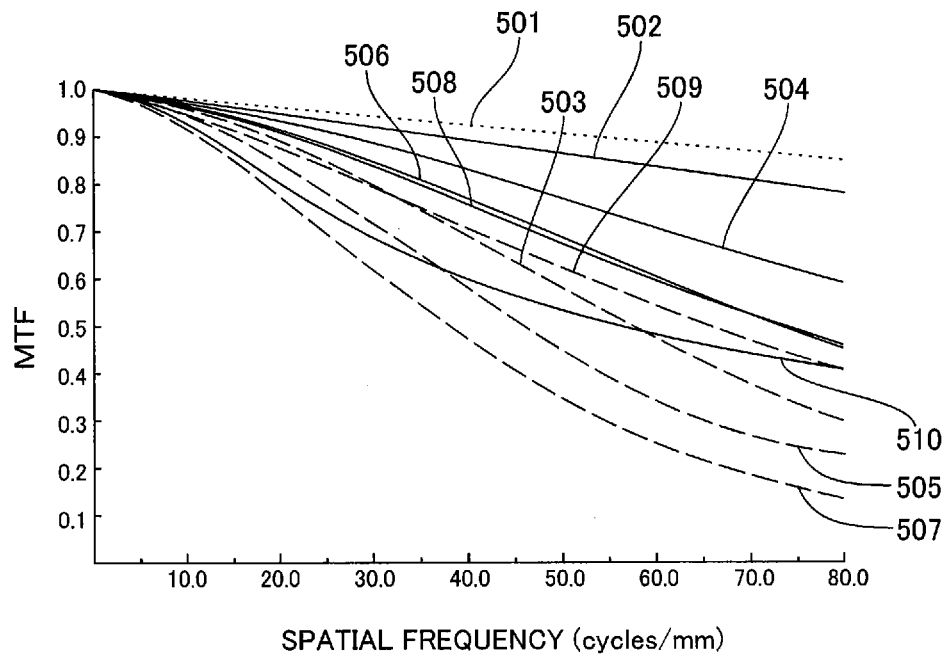
FIG. 7 is a graph showing the MTF (Modulation Transfer Function) in a state focused at an infinity distance at the wide angle end of the lens system according to the first embodiment.
Figure 8:
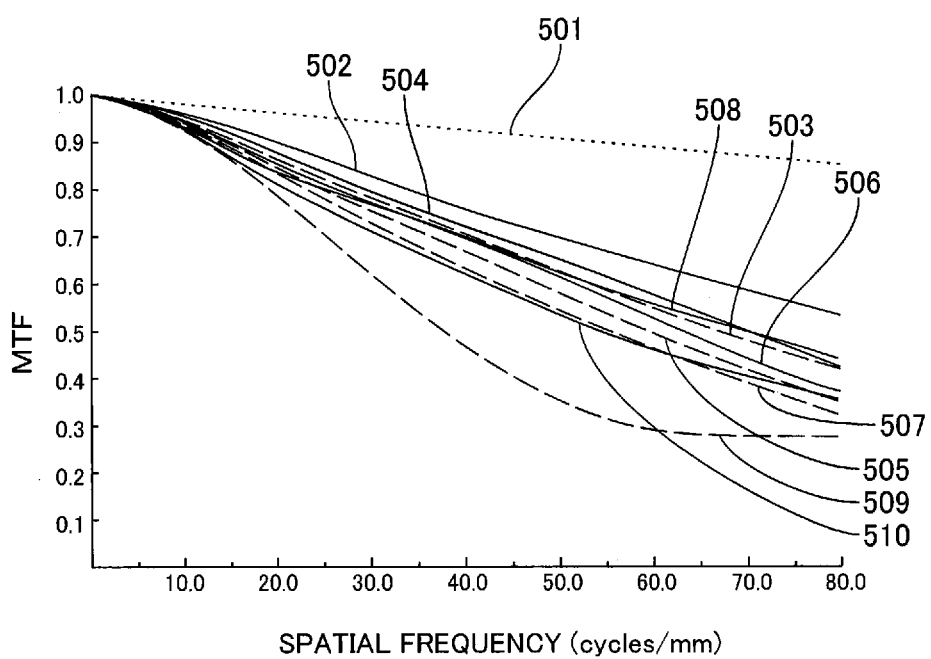
FIG. 8 is a graph showing the MTF in a state focused at an infinity distance at the telephoto end of the lens system according to the first embodiment.

FIG. 7 shows the MTF (Modulation Transfer Function) for a state focused at an infinity distance at the wide angle end of the lens system 10. FIG. 8 shows the MTF for a state focused at an infinity distance at the telephoto end of the lens system 10. In FIG. 7 and FIG. 8, the numeral 501 shows the diffraction limit, the numeral 502 shows the optical axis, the numeral 503 shows the MTF of a tangential image plane (T) for an image height of 0.4, the numeral 504 shows the MTF of a sagittal image plane (S) for an image height of 0.4, the numeral 505 shows the MTF of a tangential image plane (T) for an image height of 0.6, the numeral 506 shows the MTF of a sagittal image plane (S) for an image height of 0.6, the numeral 507 shows the MTF of a tangential image plane (T) for an image height of 0.8, the numeral 508 shows the MTF of a sagittal image plane (S) for an image height of 0.8, the numeral 509 shows the MTF of a tangential image plane (T) for an image height of 1.0, and the numeral 510 shows the MTF of a sagittal image plane (S) for an image height of 1.0. Note that the image height h is expressed as a proportion of the maximum image height for a case where the center of the image is 0 and the maximum image height is 1.0. This also applies to the embodiment described later. As shown in these drawings, the contrast of the subject can be favorably reproduced.

In this way, the lens system 10 according to the present embodiment is one example of a lens system that is wide angle with a half angle of view of 60.7° at the wide angle end and is capable of picking up sharp images with an F number of 2.6, and furthermore is equipped with a high performance focus system where there is no fluctuation in the back focus and overall lens length when zooming with a zoom ratio of around two. The overall lens length does not change due to zooming and focusing, which makes it easy to produce a robust lens system 10 that can suppress the introduction of foreign matter and the occurrence of malfunctions due to such and makes it possible to provide a lens system 10 that is favorable for picking up video and can withstand severe filming conditions. In addition, for applications that involve picking up video images, since the overall lens length does not change even in cases where a matte box or the like is installed in front of the lens system, it is possible to simplify the attachment mechanism.

Figure 9A:
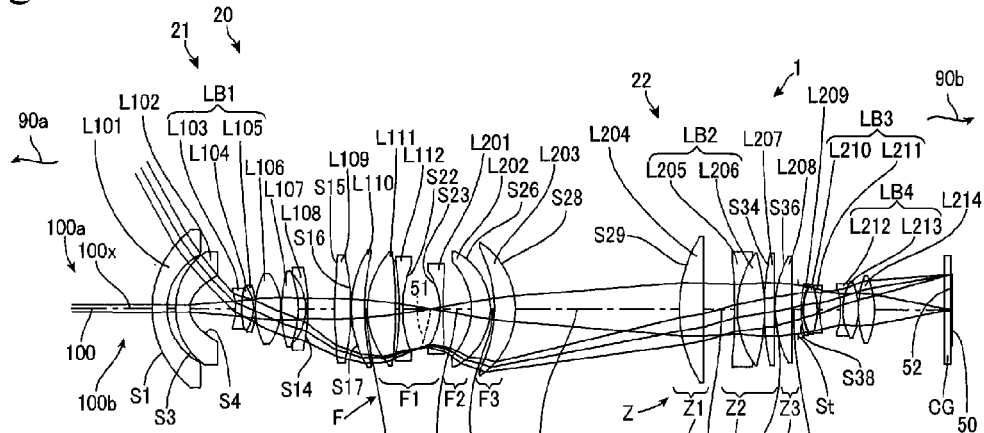
Figure 9B:
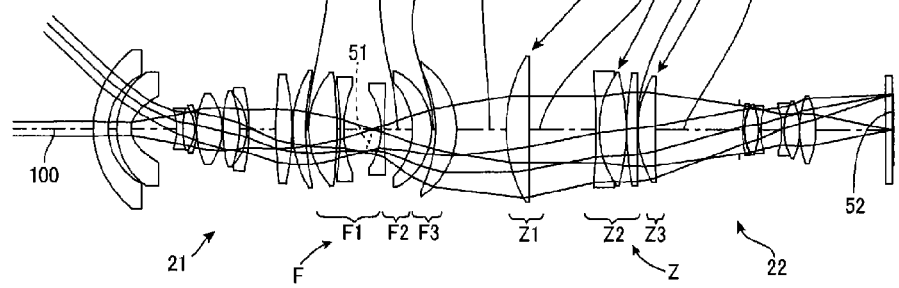
FIG. 9B shows the lens arrangement at the telephoto end.
Figure 10A:
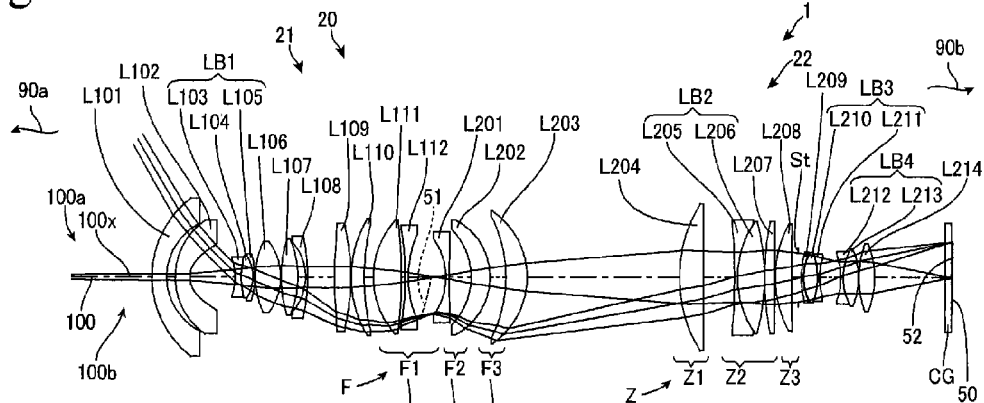
Figure 10B:
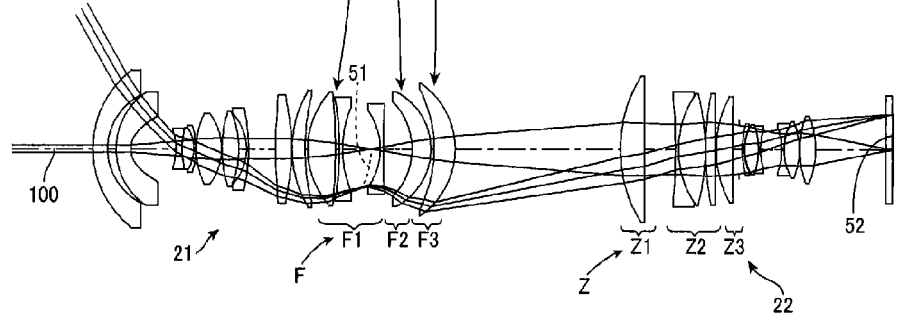
FIG. 10B shows the lens arrangement in a state where focus is set for an infinite objective distance.

FIG. 9A and FIG. 9B show the overall construction of a lens system 20 according to a second embodiment of the present invention and an imaging apparatus 1 that uses such lens system 20, with FIG. 9A showing the lens arrangement at the wide angle end (WIDE) and FIG. 9B showing the lens arrangement at the telephoto end (TELE). FIG. 10A and FIG. 10B show focusing at the wide angle end of the lens system 20, with FIG. 10A showing the lens arrangement in a state where focus is set for the shortest objective distance and FIG. 10B showing the lens arrangement in a state where focus is set for an infinity objective distance.

The lens system 20 is also composed, in order from the input side 90a, of a first lens group 21 that forms light from the input side 90a into an image as the intermediate image 51 and a second lens group 22 that forms light from the intermediate image 51 into an image as the final image 52. The lens system 20 is an image reforming-type two-stage optical system composed of a total of twenty-six glass lenses numbered L101 to L112 and L201 to L214 and includes a first optical system F that carries out focusing and a zooming optical system Z that carries out zooming inside the first lens group 21 and the second lens group 22. Note that constructions that are the same as the embodiment described above have been assigned the same reference numerals and detailed description thereof is omitted.

The first lens group 21 is composed of a meniscus-type negative lens L101 whose convex surface S1 is oriented toward the input side 90a, a meniscus-type negative lens L102 whose convex surface S3 is oriented toward the input side 90a, a cemented lens LB1 where three lenses are stuck together, a biconvex positive lens L106, a biconvex positive lens L107, a meniscus-type negative lens L108 whose convex surface S14 is oriented toward the output side 90b, a biconvex positive lens L109, a meniscus-type positive lens L110 whose convex surface S17 is oriented toward the input side 90a, a biconvex positive lens L111, and a biconcave negative lens L112 disposed in that order from the input side 90a.

Both surfaces of the negative lens L102 of the first lens group 21, that is, the convex surface S3 on the input side 90a and the concave surface S4 on the output side 90b, are aspherical surfaces. Both surfaces of the positive lens L109, that is, the convex surface S15 on the input side 90a and the convex surface S16 on the output side 90b, are aspherical surfaces. The negative lens L101 positioned closest to the input side 90a is the lens with the largest effective diameter in the lens system 10 and, with an effective diameter of 71.41 mm, is compact for a video pickup lens.

The second lens group 22 is composed of a biconcave negative lens L201, a meniscus-type positive lens L202 whose convex surface S26 is oriented toward the output side 90b, a meniscus-type positive lens L203 whose convex surface S28 is oriented toward the output side 90b, a plano-convex positive lens L204 whose convex surface S29 is oriented toward the input side 90a, a cemented lens LB2 where two lenses are stuck together, a plano-convex positive lens L207 whose convex surface S34 is oriented toward the input side 90a, a meniscus-type positive lens L208 whose convex surface S36 is oriented toward the input side 90a, an aperture stop St, a meniscus-type negative lens L209 whose convex surface S38 is oriented toward the input side 90a, a cemented lens LB3 where two lenses are stuck together, a cemented lens LB4 where two lenses are stuck together, and a biconvex positive lens L214, disposed in that order from the input side 90a.

With this lens system 20, when zooming from the wide-angle end to the telephoto end, every lens L101 to L112 of the first lens group 21 and the lenses L201 to L203 and the lenses L209 to L214 of the second lens group 22 do not move, and zooming is carried out by monotonously moving the optical systems Z1 to Z3 along the optical axis 100 from the output side 90b toward the input side 90a.

A first optical system F of the lens system 20 is also composed, in order from the input side 90a, of a first subsystem F1 which has negative refractive power and moves during focusing, a second subsystem F2 which has positive refractive power and does not move during focusing, and a third subsystem F3 which has positive refractive power and moves during focusing. The first subsystem F1 is composed of the positive lens L111 disposed second closest to the output side 90b of the first lens group 21, the negative lens L112 disposed closest to the output side 90b of the first lens group 21, and the negative lens L201 disposed closest to the input side 90a of the second lens group 22. Accordingly, the negative lens (first lens) L112 and the negative lens (second lens) L201 of the first subsystem F1 are disposed so as to sandwich the intermediate image 51, which is formed in the space between the first lens group 21 and the second lens group 22, from the input side 90a and the output side 90b with only air gaps in between.

In this lens system 20, when moving the focus from the shortest objective distance to an infinity objective distance, the lenses L101 to L110 of the first lens group 21 and the optical system F2 (the lens L202) and the lenses L204 to L214 of the second lens group 12 do not move and focusing is carried out by moving the optical system F1 which sandwiches the intermediate image 51 and moving the optical system F3 in concert with the optical system F1 so as to compensate for the movement of the optical system F1. Since it is easy to separate the light flux for each angle of view before and after the intermediate image 51, it is easy to achieve symmetry (before/after symmetry, image symmetry) for the ray angle of convergent light on the input side 90a of the intermediate image 51 and the ray angle of divergent light on the output side 90b of the intermediate image 51 relative to the intermediate image 51. This means that by moving the optical system F1, which has a symmetrical lens arrangement where the concave surfaces S22 and S23 face one another with the intermediate image 51 in between, relative to rays that symmetrically converge and diverge relative to the intermediate image 51, it is easy to cancel out fluctuations in the ray paths for each angle of view before and after the intermediate image 51. Accordingly, it is possible to provide a lens system 20 capable of carrying out focus adjustments while suppressing fluctuations in aberration that accompany focusing. In addition, the intermediate image 51 is formed so that the image plane becomes slightly inclined toward the input side 90a as the distance from the optical axis 100 increases, so as to be a concave plane that faces the input side 90a. This means that it is easy to disperse light flux in the periphery of the intermediate image 51 with a favorable balance in a state that is extremely close to telecentric.

FIG. 11 shows lens data of the respective lenses of the lens system 20. FIGS. 12A to 12E show various numeric values of the lens system 20. As shown in FIG. 12B, in the lens system 20, the air gap (distance along the optical axis) d28 between the positive lens L203 and the positive lens L204, the air gap d30 between the positive lens L204 and the negative lens L205, the air gap d35 between the positive lens L207 and the positive lens L208, and the air gap d37 between the positive lens L208 and the stop St all change during zooming. Also, as shown in FIGS. 12C and 12D, in the lens system 20, the air gap d18 between the positive lens L110 and the positive lens L111, the air gap d24 between the negative lens L201 and the positive lens L202, the air gap d26 between the positive lens L202 and the positive lens L203, and the air gap d28 between the positive lens L203 and the positive lens L204 change during focusing. Also, as shown in FIG. 12E, both surfaces S3 and S4 of the negative lens L102 and both surfaces S15 and S16 of the positive lens L109 are aspherical surfaces.

The values in the equations given as Conditions (1.1) to (1.3), (2.1) to (2.2), and (3.1) to (3.2) given earlier for the lens system 20 according to the present embodiment are as shown below using the various values in FIG. 12A.

| | |
|---|---|
| $f1=-128$ | Condition (1.1) |
| $f3=101$ | Condition (1.2) |
| $f=194$ | Condition (1.3) |
| $\|1-fwf/fwn\|=0.001$ | Condition (2.1) |
| $\|1-ftf/ftn\|=0.001$ | Condition (2.2) |
| $\|dwn-dwf\|=0.3$ | Condition (3.1) |
| $\|dtn-dtf\|=0.5$ | Condition (3.2) |

Accordingly, the lens system 20 according to the present embodiment satisfies Conditions (1.1) to (1.3), (2.1) to (2.2), and (3.1) to (3.2).

Figure 13A:
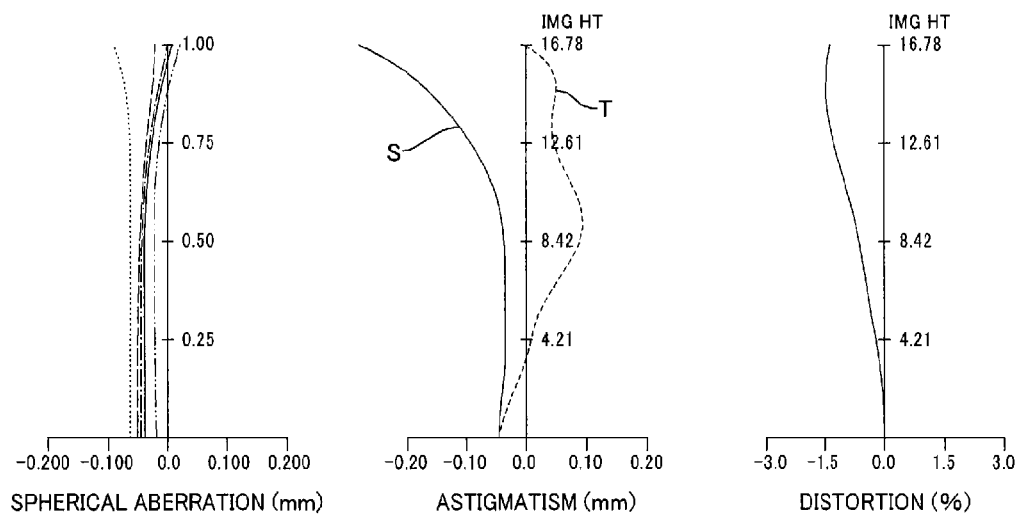
Figure 13B:
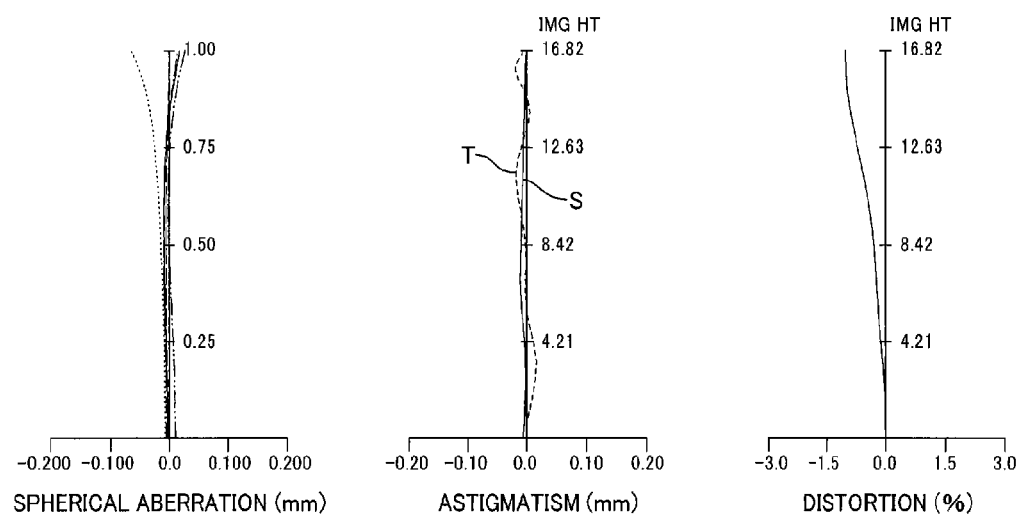
FIG. 13B shows an aberration graph for a state focused at an infinity distance.
Figure 14A:
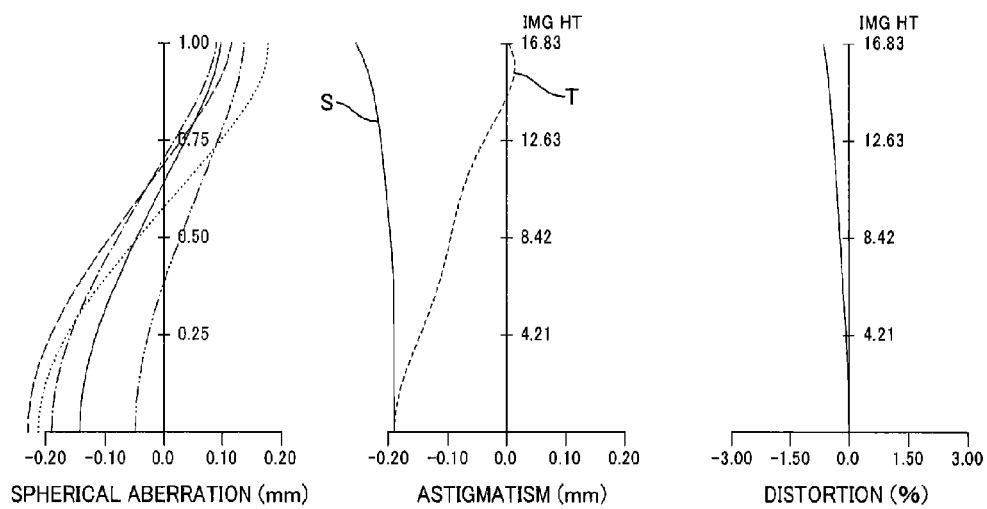
Figure 14B:
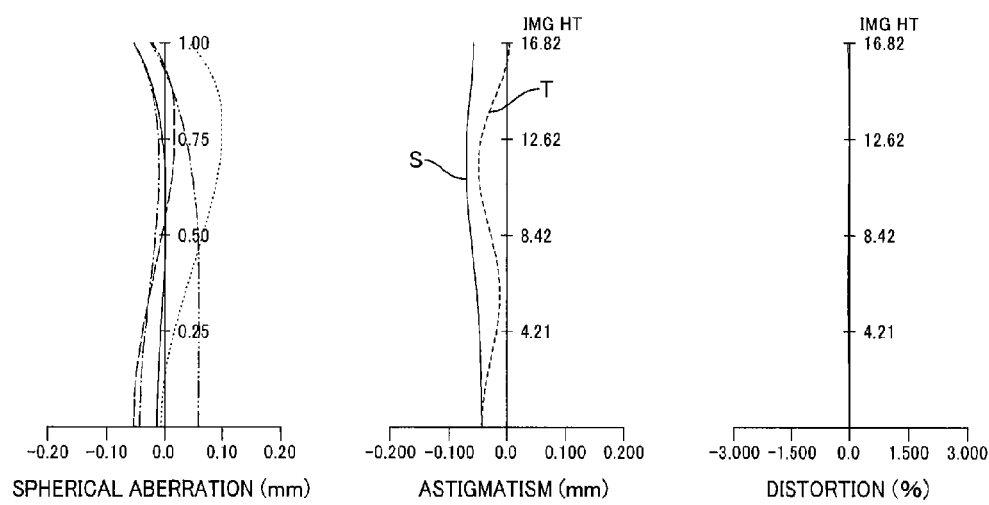
FIG. 14B is an aberration graph for a state focused at an infinity distance.

FIGS. 13A and 13B show aberration graphs at the wide angle end of the lens system 20 with FIG. 13A showing an aberration graph for a state focused at the shortest distance and FIG. 13B showing an aberration graph for a state focused at an infinity distance. FIGS. 14A and 14B show aberration graphs at the telephoto end of the lens system 20 with FIG. 14A showing an aberration graph for a state focused at the shortest distance and FIG. 14B showing an aberration graph for a state focused at an infinity distance. As shown in such drawings, all of the aberrations are favorably corrected and it is possible to pick up sharp images.

Figure 15:
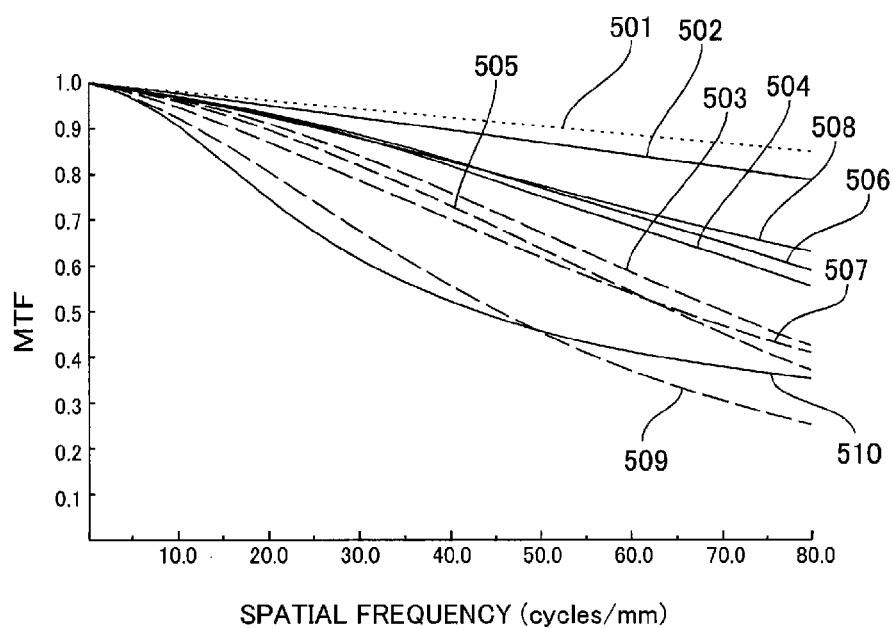
FIG. 15 is a graph showing the MTF in a state focused at an infinity distance at the wide angle end of the lens system according to the second embodiment.
Figure 16:
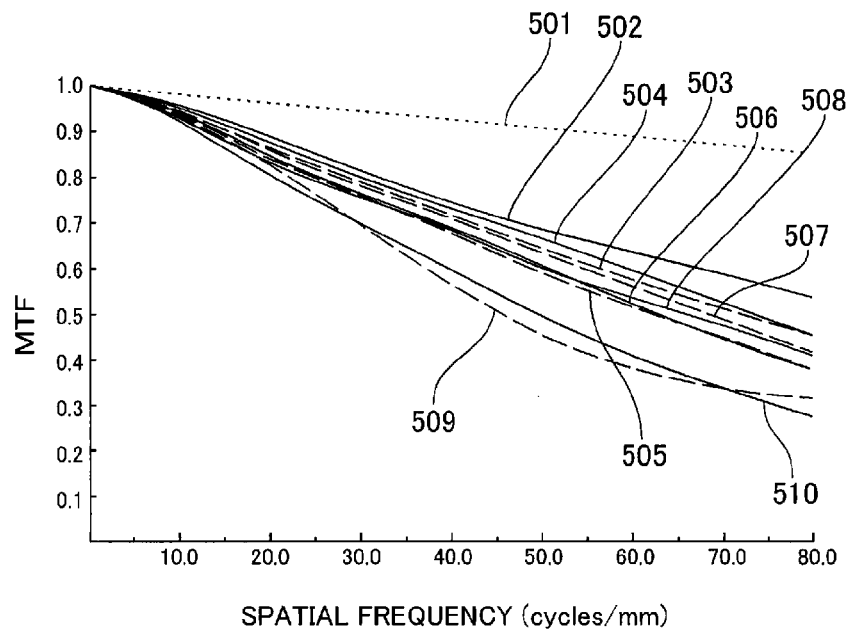
FIG. 16 is a graph showing the MTF in a state focused at an infinity distance at the telephoto end of the lens system according to the second embodiment.

FIG. 15 shows the MTF for a state focused at an infinity distance at the wide angle end of the lens system 20. FIG. 16 shows the MTF for a state focused at an infinity distance at the telephoto end of the lens system 20. As shown in these drawings, the contrast of the subject can be favorably reproduced.

Note that the present invention is not limited to the embodiments given here and includes lens systems and imaging apparatuses defined by the range of the patent claims.

The invention claimed is:

1. A lens system that comprises a first optical system and forms an intermediate image that is formed inside the first optical system by light from an input side, into a final image on an output side,
   wherein the first optical system includes a combination of lenses as follows:
      a first lens with positive refractive power that is disposed at a position closest to the intermediate image, on the input side of the intermediate image, compared to any other lens in the lens system, wherein the first lens moves during a focusing;
      a second lens with negative refractive power that is disposed at a position closest to the intermediate image, on the output side of the intermediate image, compared to any other lens in the lens system, wherein the second lens moves in synchronization with the first lens during the focusing; and
      a third lens with positive refractive power that is disposed at a position closest to the second lens, on the output side of the second lens, compared to any other lens in the lens system, wherein the third lens does not move in synchronization with the first lens during focusing.

2. The lens system according to claim 1,
wherein the first optical system further includes a fourth lens with positive refractive power that is positioned on the output side of the third lens and moves during focusing.

3. The lens system according to claim 2,
wherein a focal length f1 of a first subsystem that includes the first lens and the second lens, a focal length f3 of another subsystem that includes the fourth lens, and a focal length f of the first optical system satisfy the following conditions:

−200 mm<f1<−90 mm;

90 mm<f3<200 mm; and 190 mm<f<300 mm.

4. The lens system according to claim 1,
further comprising a second optical system that is disposed on an output side of the first optical system and includes a zooming system.

5. The lens system according to claim 4,
wherein a focal length fwf in a state focused at an infinity distance at a wide angle end of the lens system, a focal length fwn in a state focused at a shortest distance at the wide angle end of the lens system, a focal length ftf in a state focused at an infinity distance at a telephoto end of the lens system, and a focal length ftn in a state focused at a shortest distance at the telephoto end of the lens system satisfy the following conditions:

|1−fwf/fwn|<0.005; and

|1−ftf/ftn|<0.005.

6. The lens system according to claim 4,
wherein a distortion dwf in a state focused at an infinity distance at a wide angle end of the lens system, a distortion dwn in a state focused at a shortest distance at the wide angle end of the lens system, a distortion dtf in a state focused at an infinity distance at a telephoto end of the lens system, and the distortion dtn in a state focused at a shortest distance at the telephoto end of the lens system satisfy the following conditions:

|dwn−dwf|<1.0%; and

|dtn−dtf|<1.0%.

7. An imaging apparatus comprising:
the lens system according to claim 1; and
an imaging device disposed at a position where the final image of the lens system is formed.

8. The lens system according to claim 1,
wherein the second lens moves together with the first lens with a constant air gap between the first lens and the second lens during the focusing.

9. A lens system that comprises a first optical system and forms an intermediate image that is formed inside the first optical system by light from an input side of the first optical system, into a final image on an output side of the first optical system,
wherein the first optical system includes:
a first lens with positive refractive power that is disposed on the input side of the intermediate image and closer to the intermediate image than any other lens on the input side of the intermediate image, wherein the first lens moves during a focusing; and
a second lens with negative refractive power that is disposed on the output side of the intermediate image and closer to the intermediate image than any other lens on the output side of the intermediate image, wherein the second lens moves in synchronization with the first lens during the focusing; and
a third lens with positive refractive power that is disposed on the output side of the second lens and closer to the second lens than any other lens on the output side of the second lens, wherein the third lens does not move in synchronization with the first lens during focusing.

10. The lens system according to claim 9 wherein:
the first lens has a concave surface facing the intermediate image and the second lens has a concave surface facing the intermediate image, such that the concave surface of the first lens faces the concave surface of the second lens.

11. The lens system according to claim 9,
wherein the first optical system further includes a fourth lens with positive refractive power that is positioned on the output side of the third lens and that moves during focusing.

12. The lens system according to claim 9,
wherein the third lens has a convex surface facing the output side.

13. The lens system according to claim 1 wherein:
the first lens has a concave surface facing the intermediate image and the second lens has a concave surface facing the intermediate image, such that the concave surface of the first lens faces the concave surface of the second lens.

14. The lens system according to claim 13,
wherein the third lens has a convex surface facing the output side.

* * * * *